United States Patent [19]

Cook

[11] 3,924,194

[45] Dec. 2, 1975

[54] SIGNAL REGENERATOR

[75] Inventor: Charles W. Cook, Huntsville, Ala.

[73] Assignee: Avco Corporation, Huntsville, Ala.

[22] Filed: Oct. 31, 1974

[21] Appl. No.: 519,733

Related U.S. Application Data

[62] Division of Ser. No. 358,863, May 10, 1973, Pat. No. 3,863,031.

[52] U.S. Cl. ................ 328/164; 328/112; 328/138; 328/58; 328/170; 328/110; 329/146

[51] Int. Cl.² ........................................... H04B 1/04

[58] Field of Search ........... 328/138, 170, 151, 164, 328/112, 113, 114, 223, 58, 110; 329/146, 147

[56] References Cited

UNITED STATES PATENTS 3,304,372 2/1967 Filipowsky et al. ............ 328/138 X 3,437,833 4/1969 Razaitis et al. ................ 328/114 X 3,781,692 12/1973 Escoffier ............................ 328/138

3,879,583 4/1975 Rooks ............................ 328/164 X

*Primary Examiner*—John S. Heyman

*Attorney, Agent, or Firm*—Charles M. Hogan; Irwin P. Garfinkle

[57] ABSTRACT

A two-way telephone communications system passes signals of one frequency in one direction and transponds with signals of four frequencies in the other direction. The individual signals have a predetermined frequency and have a coded duration. The invention provides a system for recovering, or regenerating, the original signal without introducing frequency shift and without changing the duration of the signal.

2 Claims, 6 Drawing Figures

SIGNAL REGENERATOR

BACKGROUND OF THE INVENTION

This application is a division of application Ser. No. 358,863, filed May 10, 1973, now U.S. Pat. No. 3,863,031 entitled "Signal Regenerator" and assigned to the same assignee as the present application and invention, Avco Corporation.

This invention is of the transponder type security system disclosed in U.S. Pat. No. 3,634,824. That patent discloses a signaling system having a plurality of remote stations and a central station. A single frequency pulse or pulses is transmitted from the central station to all of the remote stations. The duration of each pulse or pulses determines the address of four stations, each of which responds with one of four discrete transponder frequencies. The transponder frequencies are transmitted in pulses having predetermined time durations indicating the status of the particular transponder.

The patented prior art system used telephone lines having transmission losses requiring signal regeneration or amplification in both directions, that is, from the central station to the transponder and from each of the transponders to the central station. The amplifiers presently in use are analog so that both signal and noise are amplified the same amount. In addition, the various time constants required by the system are apt to change the duration of the transmitted pulses, and in some cases may create a frequency shift. The present invention eliminates each of the foregoing problems by providing circuitry in which the original signal frequencies are recovered and by means of which the duration of the signal is precisely controlled.

SUMMARY OF THE INVENTION

The invention comprises a signal processing system in which a transmitted signal is a pulse or pulses having a predetermined frequency and duration. The transmitted signal, the input to the signal processing system, is first applied to a bandpass filter to eliminate at least a portion of the unwanted noise and other spurious signals. The output from the band-pass filter is limited by means of a limiter having a variable threshold voltage which is a function of the magnitude of the signal from the output of the band-pass filter. This arrangement develops a clipped output having a duration which is equal to that of the original signal and having a frequency, the fundamental of which is equal to the original signal. The output from the limiter is then applied to a positive and negative clipper which very accurately develops a square wave of predetermined amplitude and a repetition frequency equal to the frequency of the original signal. The output from the positive and negative clipper is applied to a peaking circuit which serves to "regenerate" the frequency of the original signal which is then applied through a limiter to a normally closed gate. The output from the peaking circuit is also applied to an envelope detector which produces a square wave having the envelope of the output of the peaking circuit. The output from the envelope detector controls the gate so that the recovered original signal is passed for a duration exactly equal to the envelope.

THE DRAWINGS

DESCRIPTION OF THE ILLUSTRATED EMBODIMENT

Figure 1:
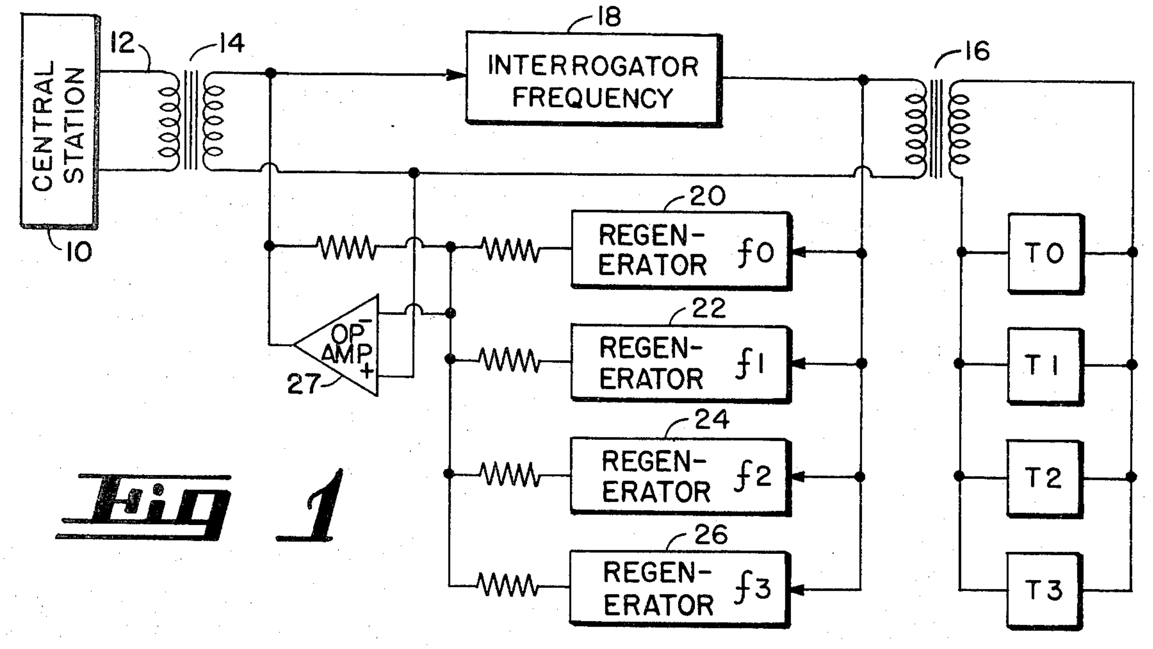
FIG. 1 is a schematic representation of a transponder type security system in which this invention is utilized.

The overall system is illustrated in FIG. 1 and it includes a central station 10 which is coupled to a plurality of remote transponder stations T0, T1, T2, and T3 over telephone lines 12 and by means of transformers 14 and 16. The output of the central station is an interrogator signal having a predetermined output frequency and duration representing each of the remote transponder stations T0–T3. The same frequency and a different duration would represent other transponder stations not illustrated. Depending on the length of the telephone lines 12, the interrogator frequency signals will require amplification without introducing a shift in frequency and without changing the duration of the pulses. The element 18 accomplishes this amplification.

The output of each of the transponders T0–T3 is a signal pulse having a predetermined duration and a predetermined frequency. The elements 20, 22, 24, 26 serve to amplify the respective outputs of each of the transponders without shifting the respective frequencies or change the respective durations of the pulses. The elements 20, 22, 24 26 are essentially identical and each represents that portion of the circuit to which the invention is directed. The output of each regenerator is applied to the transformer 14 through an operational amplifier 27.

Figure 2:
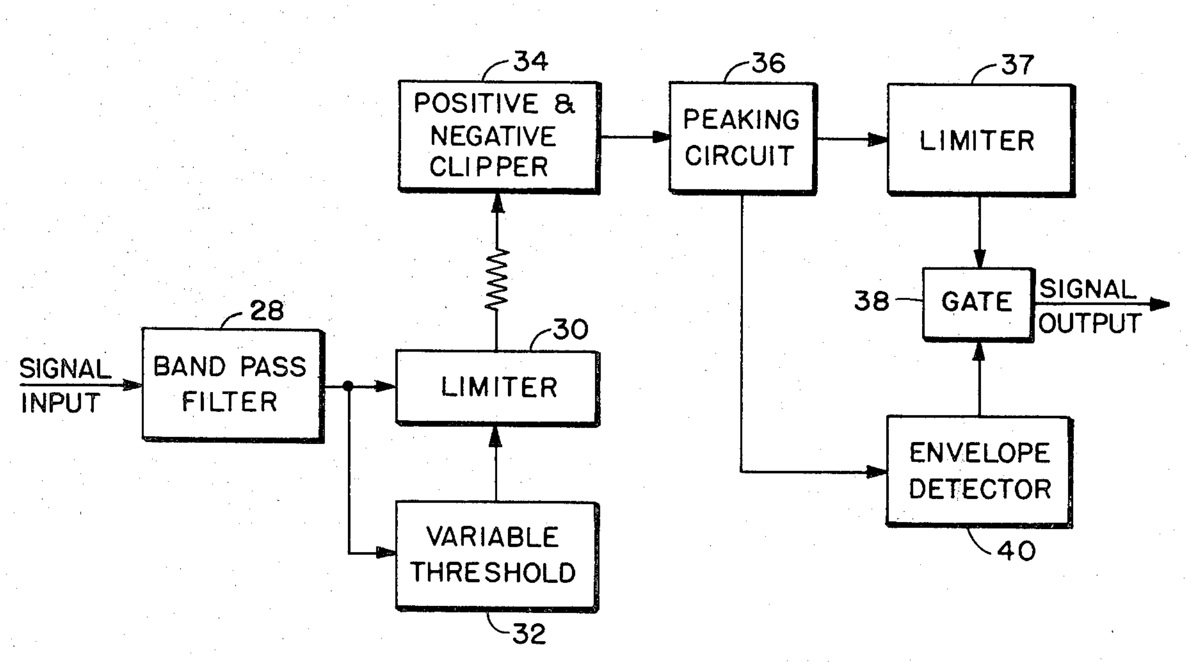
FIG. 2 is a block diagram of the invention.

The regenerators 20–26 are each shown in block diagram form in FIG. 2. Each regenerator includes a bandpass filter 28 to which the input signal from the central station or from the transponder is applied, thereby permitting the passage of only a selected input signal and with at least part of the noise attenuated. The output from the band-pass filter is a signal of given frequency and duration and it is applied to a limiter 30. The output from the band-pass filter 28 is also applied to a variable threshold circuit 32, the output of which is a direct voltage proportional to the magnitude of the signal input. The output of the variable threshold circuit 32 when applied to the limiter 30 provides a variable reference voltage for the limiter 30. For reasons which will hereafter be more fully explained, the use of the variable threshold voltage to the limiter 30 insures that the output signal of the limiter will have a duration precisely equal to its input signal.

The output from the limiter 30 is applied to a positive and negative clipper 34 and then applied to peaking circuit 36. The peaking circuit consists essentially of a series resonance circuit tuned precisely to the fundamental frequency of the original input signal. The first output from the peaking circuit is applied through a limiter 37 to a normally closed gate 38 and also to an envelope detector 40. Only those signals at the resonant frequency reach the threshold of the detector, and therefore, the output of detector 40 is a square wave having a duration equal almost exactly equal to the duration of the output from the peaking circuit 36. The width of the square wave output from the detector determines the period during which the gate 38 is open. The output from the gate 38 is the recovered signal, i.e., it is a pulse having a duration and frequency which is the same as the original signal transmitted from the central station or the transponder as the case may be.

Figure 3:
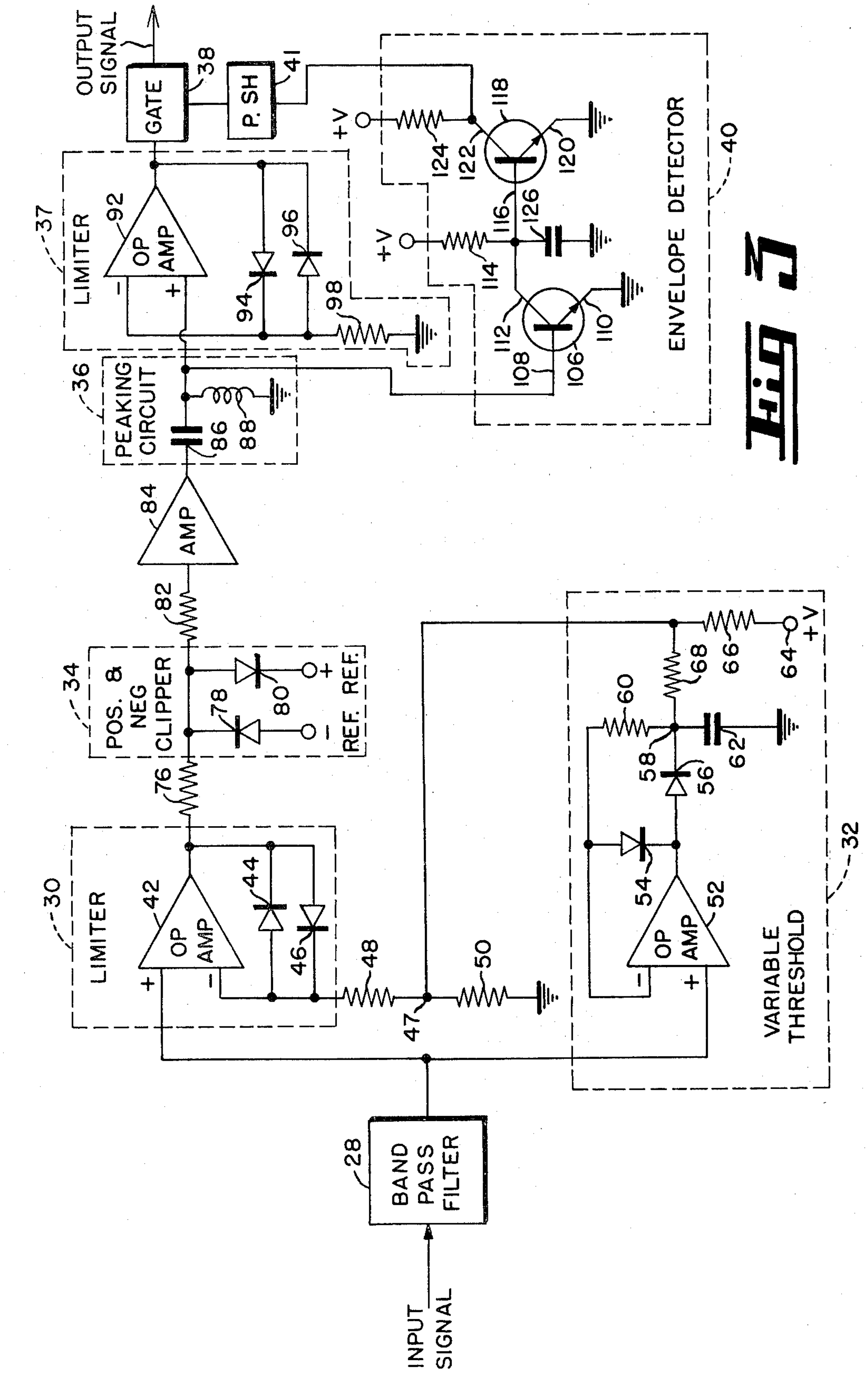
FIG. 3 is a more detailed representation of the elements shown in FIG. 2.

Additional details of the overall system are shown schematically in FIG. 3 where the output of the band-pass filter 28 is shown as being applied to the limiter 30 consisting of a conventional operational amplifier 42 having a positive and a negative input terminal. The signal from the band-pass filter 28 is applied to the positive input terminal. Oppositely poled diodes 44 and 46 are connected between the output terminal and the negative input terminal. A voltage reference level for the limiter 30 is established by means of a connection to the junction of resistors 48 and 50 from the variable threshold voltage source 32.

The variable threshold source 32 is a circuit which is sometimes called an "ideal diode rectifier". It consists of a conventional operational amplifier 52, the output of the band-pass filter 28 being applied to the positive input terminal. A diode 54 poled in one direction is connected between the negative input terminal and the output terminal. A diode 56 poled in the opposite direction is connected to the junction 58 of a resistor 60 and capacitor 62 connected between the negative input terminal and ground.

The junction 47 between resistors 48 and 50 is supplied with two voltage sources, one a fixed voltage source from the terminal 64 applied through a resistor 66, and the other the variable source supplied from the junction 58 through a resistor 68.

Figure 4:
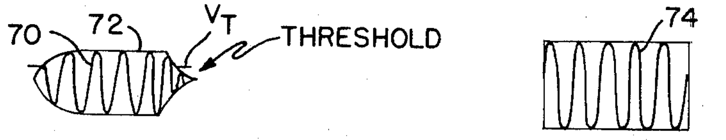
FIGS. 4, 5, and 6 are curves illustrating various signal outputs.
Figure 5:
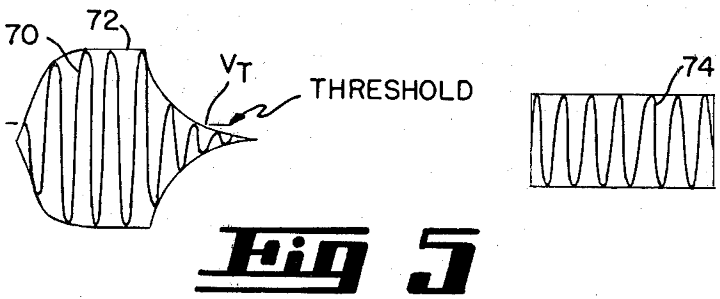

If the reference for the limiter 30 were fixed, that is if only the reference voltage from the terminal 64 were used, then the duration of the output pulses from the limiter 30 would be variable. As shown in FIG. 4, each pulse delivered at the output of the band-pass filter consists of a sine wave 70 which has a rise and fall time having an envelope 72. With the wave form shown in FIG. 4 and with a fixed threshold voltage level $V_T$, the shape and duration of the output pulse from the limiter 30 would be similar to that of the curve 74. Now if it is assumed that the amplitude of the input signal is increased as shown in FIG. 5 while maintaining the threshold at the level $V_T$, it will be seen that the duration of the curve 74 from the limiter 30 will be substantially increased. In a system which is time coded, this is not desirable, and therefore the system uses a variable voltage threshold level which is a direct function of the amplitude of the input signal.

In operation, as the input from the band-pass filter goes positive, the output of the operational amplifier 52 goes positive back-biasing the diode 54 while diode 56 conducts and provides a feedback path through resistor 60 to the negative input of the operational amplifier. As the succeeding peaks of the input signal become more negative, the output of the operational amplitude goes negative and back-biases diode 56. Diode 54 conducts, providing a feedback path to the negative input. Capacitor 62 discharges through resistor 60 with a time constant determined by the resistance and capacitance of the elements and the load on the output.

Thus, the output of the circuit 32 is a positive voltage equal to the positive peak of the input signal. This arrangement rectifies the low level signal directly, and the resultant voltage is directly proportional to input signal level. Thus, the error associated with a conventional diode voltage drop is eliminated.

The use of the "ideal diode rectifier" as a source of variable reference voltage for the limiter provides a unique arrangement for obtaining an output signal from the limiter that has a constant width independent of input amplitude. The time constant on the threshold voltage is chosen such that the decay time is longer than the decay time of the envelope of the input wave form. When this condition exists, the limiter 30 turns off as the wave form starts decaying giving an output burst that has a constant width regardless of amplitude.

The output from the limiter 30 is then applied through a resistor 76 to the positive and negative clipper 34, which is represented schematically in FIG. 3 as oppositely poled "ideal diodes" 78 and 80. The diodes are supplied with fixed voltage reference levels so that the output of the positive and negative clipper 34 is a series of square waves having a fixed amplitude and a width equal to the width of the original input signal to the band-pass filter 28. While the ideal diodes 78 and 80 are shown as conventional diodes, it will be understood that each one is similar to the ideal diode 20 shown in my application Ser. No. 347,882, filed Apr. 4, 1973 now abandoned. This eliminates the error resulting from the voltage drop across the conventional diode.

The output from the positive and negative clipper 34 is applied through a resistor 82 to a conventional amplifier 84 and then to the peaking circuit 36. The output from the amplifier 84 represents the amplified output of the positive and negative clipper 34 and is shown as the curve 85 in FIG. 6. The peaking circuit 36 is a conventional L-C circuit comprising a capacitor 86 and an inductor 88 tuned to the original input signal frequency. The output from the peaking circuit 36 is represented by the curve 89 shown in FIG. 6. It will be observed that the envelope 90 of the output signal of peaking circuit has a rise time and a decay time such that there is "ringing" after the input to the peaking circuit has been removed. The output from the peaking circuit 36 is then applied to the limiter 37. The limiter 37 comprises an operational amplifier having two input circuits, the output from the peaking circuit 36 being applied to the positive input. Oppositely poled diodes 94 and 96 are connected between the output terminal and the negative input terminal. The negative input terminal is connected to ground through a resistor 98. The output of the limiter 37 is a modified sine wave having the same frequency as the original input signal but which now has a duration in excess of the original input signal, and is shown as the curve 100 in FIG. 6. It is applied to the input of the normally closed conventional gate 38.

Figure 6:
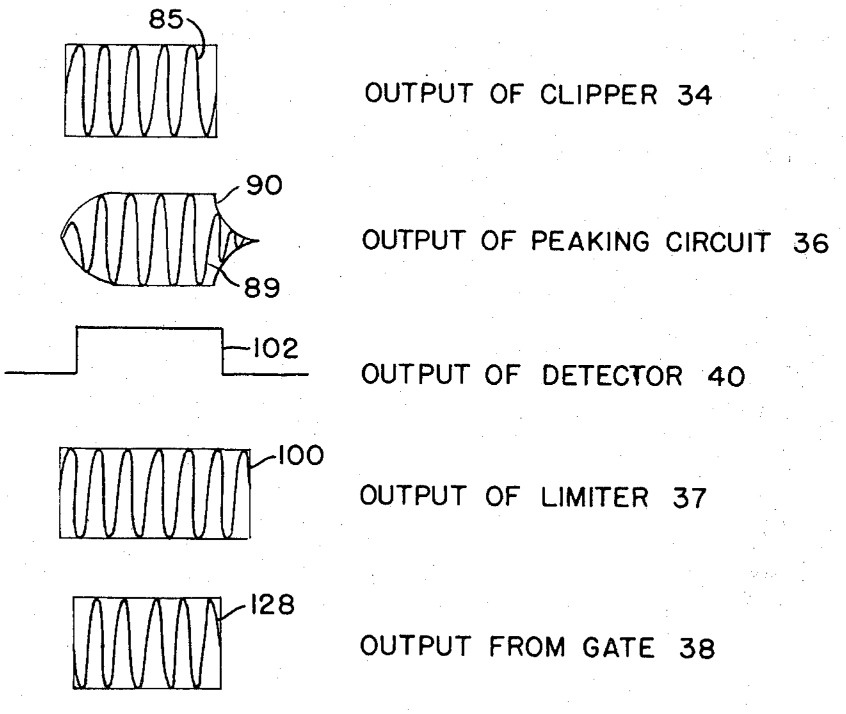

The period during which the gate 38 is maintained open is controlled by the output from the envelope detector 40 and the requirements of the system are that this period be equal to the duration of the original input signal. This is accomplished by developing a square wave output from the detector 40 and a pulse shortener 41. As shown in FIG. 6, the square wave 102 begins when the envelope 90 of the output of the peaking circuit exceeds a given threshold during its rise time and terminates after a threshold has been passed during the decay time. These results are accomplished by means of the envelope detector circuit 40 and pulse shortener 41 shown in FIG. 3. The pulse shortener 41 is required so as to eliminate a small fixed duration error determined for given circuit parameters. The envelope detector circuit comprises a transistor 106 having a base 108 supplied with the output of the peaking circuit 36, a grounded emitter 110, and a collector 112 connected to a fixed voltage source through a resistor 114. The collector 112 is connected to the base 116 of a second transistor 118 having a grounded emitter 120 and a collector 122 connected to a fixed voltage source through a resistor 124. A capacitor 126 is connected between the collector 112 and ground. Since the gate is open for a duration determined by the wave form 102, and since the frequency applied to the gate is the same as the original input signal, the output signal, shown as the curve 128 in FIG. 6, is a sine wave having a frequency and duration precisely equal to the original input signal.

I claim:

1. A signal regenerator for a signal having a predetermined frequency and duration, the combination comprising:

a resonant circuit tuned to said frequency, said signal being applied to said resonant circuit;

an AND gate having an output terminal and first and second input terminals, the signal output from said resonant circuit being applied to said first input terminal, said AND gate being enabled by an enabling pulse applied to said second input terminal; and means for generating said enabling pulse, said enabling pulse having said predetermined duration, said means comprising an envelope detector, said signal output from said resonant circuit being applied to said envelope detector, said envelope detector developing a square wave having a duration equal to the applied signal, and said envelope detector further comprising a pulse shortener for shortening said duration by a small fixed amount to eliminate a fixed error in said duration.

2. A signal regenerator for a signal initially having a predetermined frequency and duration, said signal being subject to frequency and magnitude change during transmission on a line, the combination comprising:

a resonant circuit tuned to said predetermined frequency;

means including a limiter for applying said signal to said resonant circuit, said limiter comprising an operational amplifier having first and second input terminals and an output terminal, first and second oppositely poled diodes connected between said output terminal and said second terminal, the signal output from said band-pass filter being applied to said first terminal, and a variable threshold voltage having a magnitude proportional to said signal applied to said second terminal, the output from said limiter being applied to said resonant circuit;

an AND gate having an output terminal and first and second input terminals, the signal output from said resonant circuit being applied to said first input terminal, said AND gate being enabled by an enabling pulse applied to said second input terminal; and means for generating said enabling pulse, said enabling pulse having said predetermined duration, said means for generating said enabling pulse comprising an envelope detector, said envelope detector developing a square wave having a duration equal to the applied signal, said signal output from said resonant circuit being applied to said envelope detector.

* * * * *